US011935687B2

(12) United States Patent
Inaba

(10) Patent No.: US 11,935,687 B2
(45) Date of Patent: Mar. 19, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 523 days.

(21) Appl. No.: 17/288,252

(22) PCT Filed: Oct. 4, 2019

(86) PCT No.: PCT/JP2019/039395
§ 371 (c)(1),
(2) Date: Apr. 23, 2021

(87) PCT Pub. No.: WO2020/085053
PCT Pub. Date: Apr. 30, 2020

(65) Prior Publication Data

US 2021/0391114 A1 Dec. 16, 2021

(30) Foreign Application Priority Data

Oct. 25, 2018 (JP) ................................ 2018-200775

(51) Int. Cl.
*H01F 27/28* (2006.01)
*H01F 27/24* (2006.01)
(Continued)

(52) U.S. Cl.
CPC ......... *H01F 27/2823* (2013.01); *H01F 27/24* (2013.01); *H01F 27/327* (2013.01); *H01F 41/0246* (2013.01)

(58) Field of Classification Search
CPC .... H01F 27/2823; H01F 27/24; H01F 27/327; H01F 27/2847; H01F 2003/106;
(Continued)

(56) References Cited

U.S. PATENT DOCUMENTS

| | | | | |
|---|---|---|---|---|
| 2009/0108971 A1* | 4/2009 | Okamoto | ............. | H01F 27/266 336/65 |
| 2012/0092120 A1* | 4/2012 | Yoshikawa | ........... | H01F 27/327 336/221 |

(Continued)

FOREIGN PATENT DOCUMENTS

| | | |
|---|---|---|
| JP | 2013-115140 A | 6/2013 |
| JP | 2013-219318 A | 10/2013 |
| JP | 2014-003125 A | 1/2014 |

OTHER PUBLICATIONS

International Search Report, Application No. PCT/JP2019/039395, dated Dec. 17, 2019. ISA/Japan Patent Office.

*Primary Examiner* — Shawki S Ismail
*Assistant Examiner* — Kazi S Hossain
(74) *Attorney, Agent, or Firm* — Honigman LLP

(57) ABSTRACT

A reactor including a coil and a magnetic core, the magnetic core including a first inner core portion, a second inner core portion, a first outer core portion, and a second outer core portion. The reactor includes an inner resin portion and an outer resin portion, and the first outer core portion includes a first inner face that faces the coil, a first outer face on the opposite side to the first inner face, and an outward protruding portion protruding from the first outer face. When viewed from the first outer face side, the outer circumferential contour line of the outward protruding portion is
(Continued)

located inside the outer circumferential contour line of the first outer face, and the end face of the outward protruding portion is exposed from the outer resin portion and is flush with the surface of the outer resin portion.

10 Claims, 7 Drawing Sheets

(51) Int. Cl.
*H01F 27/32* (2006.01)
*H01F 41/02* (2006.01)

(58) Field of Classification Search
CPC ........ H01F 3/10; H01F 27/263; H01F 27/022; H01F 37/00
USPC ....................................... 336/221, 83, 5, 183
See application file for complete search history.

(56) References Cited

U.S. PATENT DOCUMENTS

2019/0027295 A1* 1/2019 Hirabayashi .......... H01F 27/022
2020/0075215 A1 3/2020 Nanbara et al.

* cited by examiner

REACTOR

CROSS-REFERENCE TO RELATED APPLICATIONS

This application is the U.S. national stage of PCT/JP2019/039395 filed on Oct. 4, 2019, which claims priority of Japanese Patent Application No. JP 2018-200775 filed on Oct. 25, 2018, the contents of which are incorporated herein.

TECHNICAL FIELD

The present disclosure relates to a reactor.

BACKGROUND

For example, JP 2014-003125 A discloses a reactor that is provided with a coil that has a pair of winding portions formed by winding a winding wire and a magnetic core that forms a closed magnetic circuit, and is used as a component of a converter of a hybrid automobile or the like. The magnetic core provided in the reactor can be divided into inner core portions disposed inside each of the winding portions, and outer core portions disposed outside the winding portions. The coil and magnetic core are integrated by a resin cover (resin portion) formed through injection molding.

A reactor installed to an installation target is electrically connected to an external device. At this time, the winding wire end portions of the coil of the reactor are connected to the external device. Thus, when the reactor is installed at a predetermined position of the installation target, it is favorable that the winding wire end portions are accurately positioned at the installation target. However, with the configuration disclosed in JP 2014-003125 A, there are cases where the winding wire end portions of the reactor are not accurately positioned due to dimension errors in the coil or magnetic core, dimension errors in the resin cover, and the like. If such a reactor is installed to the installation target, the winding wire end portions are not disposed at the desired positions at the installation target, and efforts need to be taken to connect the reactor to the external device.

It is an object of the present disclosure to provide a reactor with which winding wire end portions of a coil can be accurately positioned even if a configuration is employed where the coil and the magnetic core are integrated using a resin portion.

SUMMARY

A reactor according to the present disclosure includes a first winding portion and a second winding portion arranged parallel to each other, and a magnetic core that forms a ring-shaped closed magnetic circuit. The magnetic core includes a first inner core portion, a second inner core portion, a first outer core portion, and a second outer core portion, the first inner core portion is disposed inside the first winding portion. The second inner core portion is disposed inside the second winding portion. The first outer core portion is joined to one end of the first inner core portion and one end of the second inner core portion, and the second outer core portion is joined to another end of the first inner core portion and another end of the second inner core portion. The reactor includes an inner resin portion filled inside the first winding portion and the second winding portion; and an outer resin portion that is joined to the inner resin portion and covers at least a portion of the first outer core portion and the second outer core portion. The first outer core portion includes: a first inner face that faces the coil; a first outer face on an opposite side to the first inner face; and an outward protruding portion that protrudes from the first outer face. When viewed from the first outer face side, an outer circumferential contour line of the outward protruding portion is located inside an outer circumferential contour line of the first outer face, and an end face of the outward protruding portion is exposed from the outer resin portion and is flush with a surface of the outer resin portion.

Effects of the Present Disclosure

With the above-described configuration, the winding wire end portions of the coil in the reactor can be accurately positioned.

DETAILED DESCRIPTION OF PREFERRED EMBODIMENTS

Figure 1:
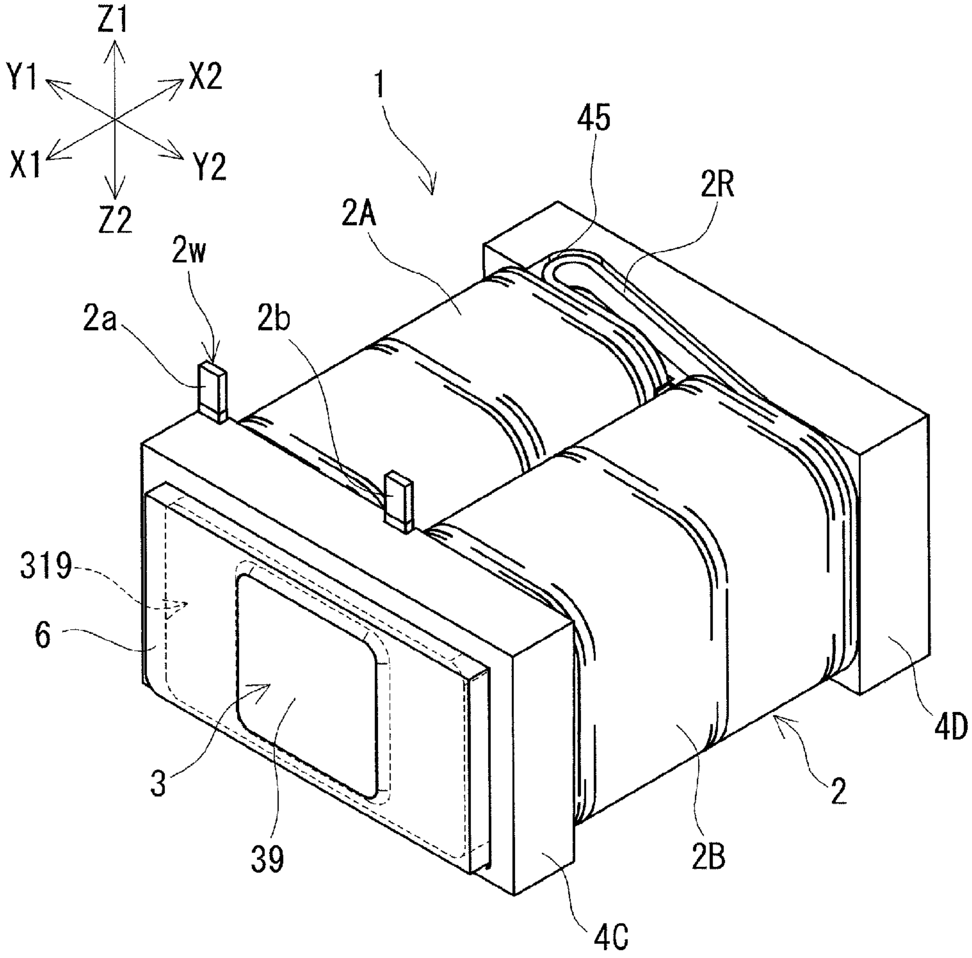
FIG. 1 is a schematic perspective view of a reactor according to Embodiment 1.

First, embodiments of the present disclosure are listed and described.

A reactor according to an embodiment includes a first winding portion and a second winding portion arranged parallel to each other, and a magnetic core that forms a ring-shaped closed magnetic circuit. The magnetic core includes a first inner core portion, a second inner core portion, a first outer core portion, and a second outer core portion, the first inner core portion is disposed inside the first winding portion. The second inner core portion is disposed inside the second winding portion. The first outer core portion is joined to one end of the first inner core portion and one end of the second inner core portion, and the second outer core portion is joined to another end of the first inner core portion and another end of the second inner core portion. The reactor includes an inner resin portion filled inside the first winding portion and the second winding portion; and an outer resin portion that is joined to the inner resin portion and covers at least a portion of the first outer core portion and the second outer core portion. The first outer core portion includes: a first inner face that faces the coil; a first outer face on an opposite side to the first inner face; and an outward protruding portion that protrudes from the first outer face. When viewed from the first outer face side, an outer circumferential contour line of the outward protruding portion is located inside an outer circumferential contour line of the first outer face, and an end face of the outward protruding portion is exposed from the outer resin portion and is flush with a surface of the outer resin portion.

The reactor including the outward protruding portion can be easily connected to an external device by installing the reactor to an installation target with reference to the end face of the outward protruding portion. The end face of the outward protruding portion is exposed from the outer resin portion, and thus the distance between the end face of the outward protruding portion and the winding wire end portions can be accurately determined. This is because variations in thickness when molding the outer resin portion do not degrade the accuracy of the above-mentioned distance. Thus, as long as the reactor is installed at a predetermined position of the installation target with reference to the end face of the outward protruding portion, the winding wire end portions of the reactor can be accurately disposed at desired positions at the installation target. As a result, the external device provided at the installation target can be easily connected to the winding wire end portions of the reactor.

As a result of the outer circumferential contour line of the outward protruding portion being located inside the outer circumferential contour line of the first outer face, the outer resin portion covering the first outer face is in a joined state without being divided in an up-down or left-right direction by the outward protruding portion. Thus, the first outer core portion can be firmly fixed to the coil by the outer resin portion.

As a result of the outward protruding portion being exposed from the outer resin portion, the heat dissipation of the magnetic core, that is, the heat dissipation of the reactor can be increased.

As an example of a second aspect of the reactor according to the embodiment, the second outer core portion can include: a second inner face that faces the coil; and a second outer face on an opposite side to the second inner face, and the second outer face can be covered by the outer resin portion, and the outer resin portion can have a gate mark in the portion covering the second outer face.

In order to expose the outward protruding portion of the first outer core portion from the outer resin portion, it is preferable that resin molding is performed from the second outer core portion side in a state where the end face of the outward protruding portion is abutted against the inner circumferential face of a mold. In this case, gate marks are formed in the portion of the outer resin portion that covers the second outer face of the second outer core. The gate marks are formed in correspondence to resin filling holes of the mold used in resin molding, and thus can be visually confirmed. If resin molding is performed from the second outer core portion side, the entire second outer face of the second outer core portion is covered by the outer resin portion. As a result, the second outer core portion can be firmly fixed to the coil by the outer resin portion.

As an example of a third aspect of the reactor according to the embodiment the coil can include: a first winding wire end portion drawn out from the first winding portion on one end side in an axial direction of the first winding portion; and a second winding wire end portion drawn out from the second winding portion on the same side as the first winding wire end portion, and the first outer core portion can be provided on the side on which the first winding wire end portion and the second winding wire end portion are disposed.

By providing the first outer core portion at a position close to the winding wire end portions, the position accuracy of the winding wire end portions with reference to the end face of the outward protruding portion of the first outer core portion can be increased. Even if there is a dimension error in the members forming the reactor, the dimension error is unlikely to have an effect if the outward protruding portion is located near the winding wire end portions.

As an example of a fourth aspect of the reactor according to the embodiment, a protruding length of the outward protruding portion from the first outer face can be 0.1 mm to 2.0 mm inclusive.

In the reactor of this embodiment, the end face of the outward protruding portion is flush with the surface of the outer resin portion. Thus, the protruding height of the outward protruding portion can be considered as being equal to the thickness of the outer resin portion covering the first outer face. The protruding length of the outward protruding portion being 0.1 mm or more means that the thickness of the outer resin portion covering the first outer face is 0.1 mm or more. As described above, the outer resin portion covering the first outer face is not divided in an up-down or left-right direction by the outward protruding portion. Thus, if the thickness of the outer resin portion is 0.1 mm or more, the effect of the outer resin portion firmly fixing the first outer core portion can be sufficiently obtained. On the other hand, if the protruding length of the outward protruding portion is 2.0 mm or less, the length of the magnetic core in the X axis direction is not excessively long. Thus, the size of the reactor can be kept from being unnecessarily large.

An example of a fifth aspect of the reactor according to the embodiment can include: a first holding member that is interposed between an end face of the coil and the first outer core portion, and holds the coil and the first outer core portion; and a second holding member that is interposed between an end face of the coil and the second outer core portion, and holds the coil and the second outer core portion, and the inner resin portion and the outer resin portion can be joined to each other inside the first holding member and the second holding member.

The coil and the magnetic core can be firmly fixed by providing the holding members. Also, as a result of performing resin molding in a state where the coil and the magnetic core are held by the holding members, the resin can be kept from reaching the outer side of the winding portions (see the reactor manufacturing method illustrated in the embodiment described below). The winding portions are exposed bare to the outside if the resin does not reach the outer side of the winding portions, and thus heat dissipation from the winding portions can be promoted. Also, because there is no resin outside of the winding portions, an increase in the size of the reactor can be suppressed.

An example of a sixth aspect of the reactor according to the embodiment can include an inward protruding portion provided on the first inner face and protruding toward a space between the first winding portion and the second winding portion.

By providing the first outer core portion with the inward protruding portion, a magnetic flux leakage spanning the pair of inner core portions without passing through the first outer core portion can be kept from permeating the winding portions. Such a magnetic flux leakage is likely to occur in the vicinity of a joint between the inner core portions and the outer core portions. More specifically, a portion of a magnetic flux moving from one inner core portion toward an outer core portion leaks toward the other inner core portion and not the outer core portion. At this time, if the outer core portion is provided with an inward protruding portion of a magnetic body, the magnetic flux leakage is likely to move toward the inward protruding portion. By guiding the magnetic flux leakage to the inward protruding portion, the magnetic flux leakage can be kept from permeating the winding portions, and thus the magnetic characteristics of the reactor can be kept from being degraded.

By providing the above-described inward protruding portion, the magnetic characteristics of the reactor can be improved without increasing the space between the pair of winding portions or increasing the size of the magnetic core. Also, the above-described inward protruding portion protrudes toward a space between the first winding portion and the second winding portion, and thus there is no increase in the external size of the reactor even if an outer core portion is provided with the inward protruding portion. Accordingly, with the configuration of the above-described reactor, the magnetic characteristics of the reactor can be improved without increasing the size of the reactor.

As an example of a seventh aspect of the reactor according to the embodiment, a relative magnetic permeability of the first inner core portion and the second inner core portion can be 5 to 50 inclusive, and can be lower than a relative magnetic permeability of the first outer core portion and the second outer core portion.

By making the relative magnetic permeability of the outer core portions higher than the relative magnetic permeability of the inner core portions, a magnetic flux leakage between the inner core portions and the outer core portions can be mitigated. In particular, by increasing the difference in relative magnetic permeability between the inner core portions and the outer core portions, a magnetic flux leakage between the inner core portions and the outer core portions can be more reliably mitigated. The above-described magnetic flux leakage can be largely mitigated by the above-described difference. Also, in the above-described embodiment, because the relative magnetic permeability of the inner core portions is low, the relative magnetic permeability of the overall magnetic core can be kept from being excessively high, and a magnetic core with a gapless structure can be realized.

In an eighth aspect of the reactor according to the seventh aspect, the relative magnetic permeability of the first outer core portion and the second outer core portion can be 50 to 500 inclusive.

By setting the relative magnetic permeability of the outer core portions to be in the above-described range, a small reactor that is unlikely to undergo magnetic saturation can be realized.

As an example of a ninth aspect of the reactor according to the seventh or eighth aspect, the first inner core portion and the second inner core portion can be formed of a compact made of a composite material including a soft magnetic powder and resin.

Adjusting the amount of soft magnetic powder in the compact made of the composite material makes it easy to reduce the relative magnetic permeability of the compact. Thus, in the case of a compact made of the composite material, an inner core portion with a relative magnetic permeability that meets the range described in the seventh aspect can be easily produced.

As an example of a tenth aspect of the reactor according to any one of the seventh aspect to the ninth aspect, the first outer core portion and the second outer core portion can be formed of a powder compact made of a soft magnetic powder.

In the case of a powder compact, the outer core portions can be accurately produced. Also, if a powder compact including soft magnetic powder of a precise amount is employed, an outer core portion with a relative magnetic permeability meeting the condition of the seventh aspect or alternatively meeting the range in the eighth aspect can be easily produced.

As an example of an eleventh aspect of the reactor according to any one of the seventh aspect to the ninth aspect, the outer core portion can be formed of a compact made of a composite material including a soft magnetic powder and a resin.

If the composite material is used, even an outer core portion with a complex shape including the outward protruding portion can be easily produced.

Below, embodiments of the reactor of the present disclosure will be described based on the drawings. In the drawings, the same reference numerals denote the same components. Note that the present disclosure is not limited to the configurations shown in these embodiments, but is indicated by the claims, and all changes that come within the meaning and range of equivalency of the claims are intended to be embraced therein.

Embodiment 1

In Embodiment 1, the configuration of a reactor 1 will be described based on FIGS. 1 to 7. The reactor 1 shown in FIG. 1 is formed by combining a coil 2, a magnetic core 3, and holding members 4C and 4D. The reactor 1 further includes an inner resin portion 5 (see FIG. 2) disposed inside a first winding portion 2A and a second winding portion 2B provided in the coil 2, and an outer resin portion 6 that covers at least a portion of outer core portions 3C and 3D (see FIG. 2) that constitute the magnetic core 3. One feature of this reactor 1 is that an outward protruding portion 39 is formed on the outer core portion 3C. Each of the configurations included in the reactor 1 are described below in detail.

Coil

As shown in FIG. 1, the coil 2 of the present embodiment includes the first winding portion 2A and the second winding portion 2B arranged parallel to each other, and a coupling portion 2R that couples the winding portions 2A and 2B. The winding portions 2A and 2B have the same number of turns as each other, are formed into hollow tubular shapes extending in the same winding direction, and are arranged parallel to each other such that the axial directions thereof are parallel to each other. In the present example, the coil 2 is manufactured using a single winding wire 2*w*.

Unlike the present example, the first winding portion 2A and the second winding portion 2B may have a different number of turns, and be of different sizes. Also, the coil 2 may be manufactured by coupling winding portions 2A and 2B produced using separate winding wires 2*w*.

The winding portions 2A and 2B according to the present embodiment are formed into rectangular tubular shapes. The rectangular tubular shaped winding portions 2A and 2B are winding portions having a shape with rounded corners whose end face has a rectangular shape (including a square shape). Naturally, the winding portions 2A and 2B may also be formed in a cylindrical shape. The cylindrical shaped winding portions are winding portions whose end face has a closed surface shape (oval shape, perfect circle shape, race track shape, etc.).

The coil 2 including the winding portions 2A and 2B can be constituted by a coated wire including an insulating coating made of an insulating material around the outer circumference of a conductor such as a flat rectangular wire or a round wire made of an electrically conductive material such as copper, aluminum, magnesium, or an alloy thereof.

In the present embodiment, the winding wire 2*w* is a coated rectangular wire in which the conductor is a copper rectangular wire and the insulating coating is made of enamel (typically polyamideimide). The winding portions 2A and 2B are formed by subjecting this coated rectangular wire to edge-wise winding.

The coil 2 includes a first winding wire end portion 2*a* and a second winding wire end portion 2*b* to be connected to an un-shown terminal member. The first winding wire end portion 2*a* is drawn out from the first winding portion 2A on one end side (opposite side to coupling portion 2R) in the axial direction of the first winding portion 2A. The second winding wire end portion 2*b* is drawn out from the second winding portion 2B on one end side in the axial direction of the second winding portion 2B. The insulating coating made of enamel or the like is stripped from the winding wire end portions 2*a* and 2*b*. An external apparatus such as a power source that supplies power to the coil 2 is connected via the terminal member connected to the winding wire end portions 2*a* and 2*b*.

Here, directions of the reactor 1 will be defined with reference to the coil 2. First, the direction extending in the axial direction of the winding portions 2A and 2B of the coil 2 is defined as the X axis direction. The direction orthogonal to the X axis direction and extending in the parallel-arrangement direction of the winding portions 2A and 2B is defined as the Y axis direction. The direction intersecting the X axis direction and the Y axis direction is defined as the Z axis direction. Also, the following directions are defined.

X1 direction Direction in the X axis direction extending toward the winding wire end portions 2*a* and 2*b*.

X2 direction Direction in the X axis direction extending toward the coupling portion 2R.

Y1 direction Direction in the Y axis direction extending toward the first winding portion 2A.

Y2 direction Direction in the Y axis direction extending toward the second winding portion 2B.

Z1 direction Direction in the Z axis direction extending toward the side on which the coupling portion 2R is disposed.

Z2 direction Direction in the Z axis direction extending opposite to the Z1 direction.

Magnetic Core

Figure 2:
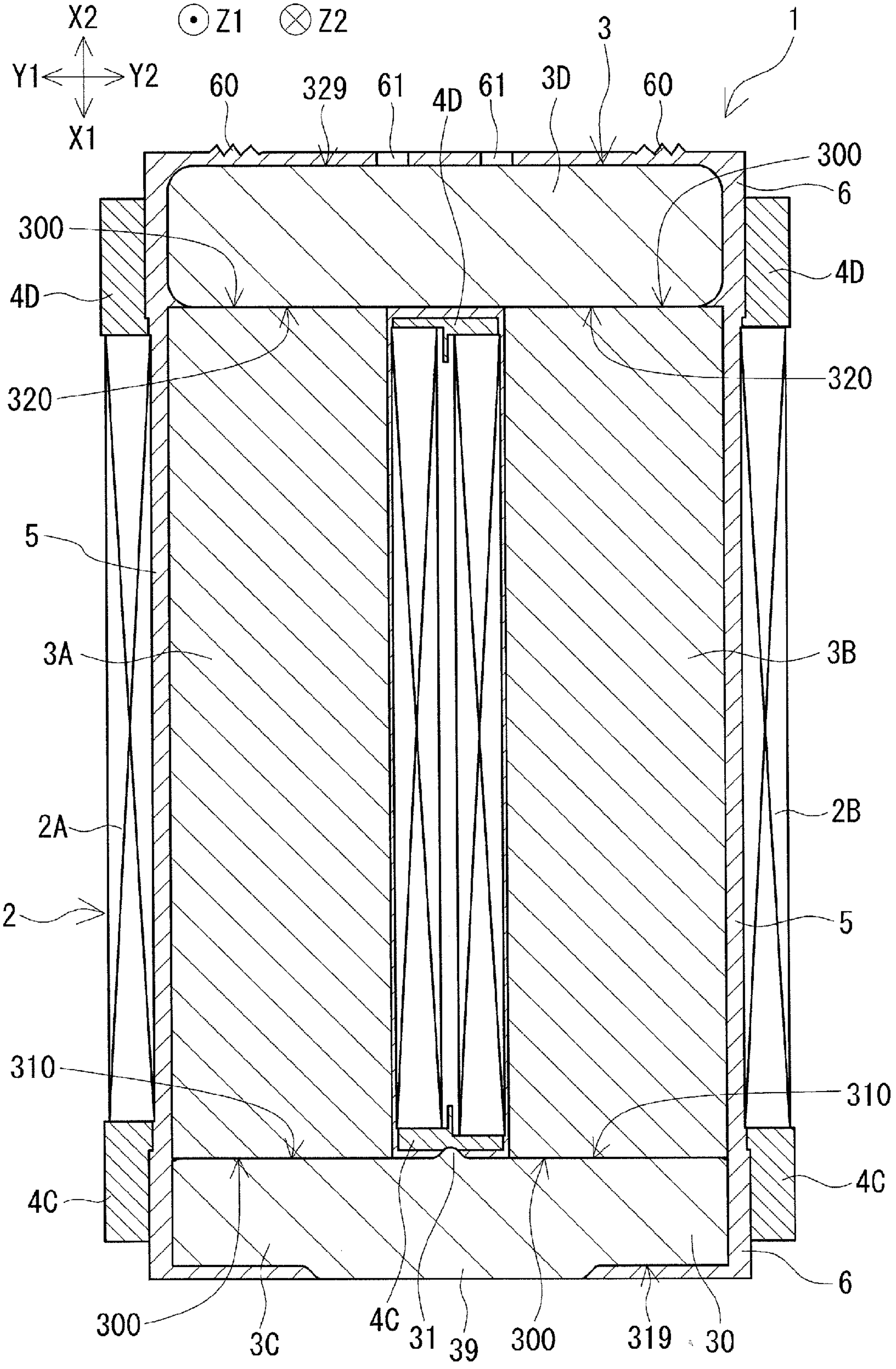
FIG. 2 is a schematic horizontal cross-sectional view of the reactor shown in FIG. 1.
Figure 3:
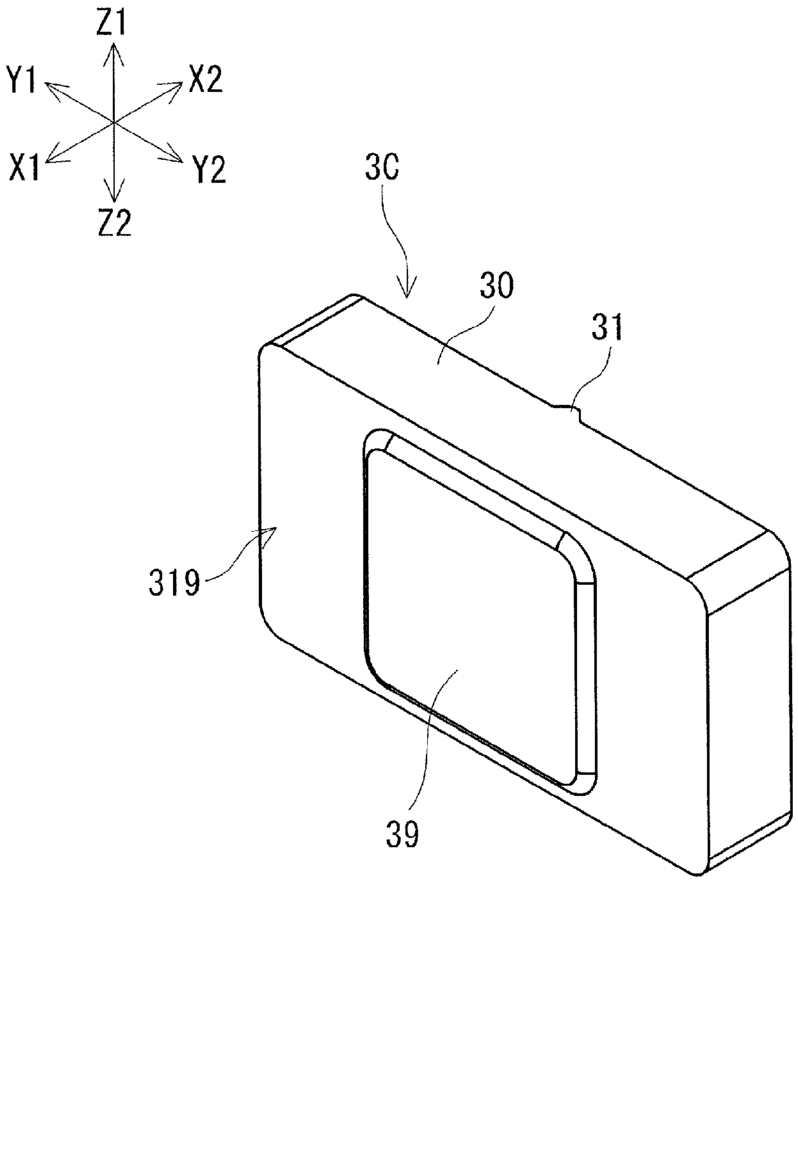
FIG. 3 is a schematic perspective view of a first outer core portion provided in the reactor shown in FIG. 1, as seen from the outer side.

As shown in FIG. 2, the magnetic core 3 includes a first inner core portion 3A, a second inner core portion 3B, a first outer core portion 3C, and a second outer core portion 3D. The first inner core portion 3A is disposed inside the first winding portion 2A. The second inner core portion 3B is disposed inside the second winding portion 2B. The first outer core portion 3C joins one end (end portion in X1 direction) of the first inner core portion 3A and one end of the second inner core portion 3B. The second outer core portion 3D joins the other end (end portion in X2 direction) of the first inner core portion 3A and the other end of the second inner core portion 3B. A closed magnetic circuit is formed by joining these core portions 3A, 3B, 3C, and 3D in a ring shape.

Inner Core Portion

The inner core portion 3A (3B) is a portion extending in the axial direction of the winding portion 2A (2B) of the coil 2, that is, extending in the X axis direction. In the present example, in the magnetic core 3, both end portions of the portions of the magnetic core 3 extending in the axial direction of the winding portions 2A and 2B protrude from end faces of the winding portions 2A and 2B (see the positions of end faces 300 of the inner core portions 3A and 3B). The protruding portions are also portions of the inner core portions 3A and 3B.

The shape of the inner core portion 3A (3B) is not particularly limited as long as it matches the internal shape of the winding portion 2A (2B). The inner core portion 3A (3B) of the present example is an approximately rectangular parallelepiped shape. The inner core portion 3A (3B) may be formed by coupling a plurality of divided cores and gap plates, but employing one member such as in the present example is preferred because the reactor 1 is easier to assemble.

Outer Core Portion

The outer core portion 3C (3D) is a portion of the magnetic core 3 disposed outside the winding portions 2A and 2B. The shape of the outer core portion 3C (3D) is not particularly limited as long as it is a shape that joins end portions of the pair of inner core portions 3A (3B). The outer core portion 3C (3D) of the present example has an approximately rectangular parallelepiped shape (see FIGS. 3 and 4).

The first outer core portion 3C includes an inner face 310 (called a "first inner face" in the present example) that faces end faces of the winding portions 2A and 2B of the coil 2, and an outer face 319 (called a "first outer face" in the present example) located on the side opposite to the first inner face 310. Also, the second outer core portion 3D includes an inner face 320 (called a "second inner face" in the present example) that faces end faces of the winding portions 2A and 2B of the coil 2, and an outer face 329 (called a "second outer face" in the present example) located on the opposite side to the second inner face 320. As shown in FIG. 2, the first inner face 310 (second inner face 320) is in contact with end faces 300 of the core portions 3A and 3B, or is substantially in contact with the end faces 300 via an adhesive.

The first outer core portion 3C according to the present example includes a main body portion 30 that is the main passage of a magnetic path, and an inward protruding portion 31 and the outward protruding portion 39 provided on the main body portion 30. On the other hand, the second outer core portion 3D of the present example does not include the inward protruding portion 31 nor the outer protruding portion 39. In contrast to the present example, the second outer core portion 3D may include the inward protruding portion 31.

Inward Protruding Portion

As shown in FIG. 2, the inward protruding portion 31 is provided on the first inner face 310 of the first outer core portion 3C, and protrudes toward the space between the first winding portion 2A and the second winding portion 2B. That is, the inward protruding portion 31 protrudes in the X2 direction. The inward protruding portion 31 in the present example is provided integrally with the main body portion 30.

By providing the first outer core portion 3C with the inward protruding portion 31, a magnetic flux leakage spanning the inner core portions 3A and 3B without passing through the first outer core portion 3C can be kept from permeating the winding portions 2A and 2B. For example, in the case where magnetic flux leaks from the first inner core portion 3A toward the second inner core portion 3B without passing through the first outer core portion 3C, the magnetic flux leakage can be directed toward the inward protruding portion 31. This is because a magnetic flux has a tendency to pass through portions with relatively high permeability. As a result, a magnetic flux leakage can be kept from permeating the winding portion 2B, and thus magnetic characteristics of the reactor 1 can be kept from degrading.

The inward protruding portion 31 protrudes toward the winding portions 2A and 2B, but is not large enough to be interposed between the winding portions 2A and 2B. The protruding length of the inward protruding portion 31 from the first inner face 310 is preferably from 0.1 mm to 2.0 mm inclusive, and as long as the protruding length of the inward protruding portion 31 is 0.1 mm or more, the above-described effect of the inward protruding portion 31 can be sufficiently obtained. Also, when the protruding length of the inward protruding portion 31 is 2.0 mm or less, the inward protruding portion 31 does not interfere with the arrangement of other members (for example, winding portions 2A and 2B). The protruding length of the inward protruding portion 31 is more preferably 1.0 mm to 2.0 mm inclusive.

Figure 4:
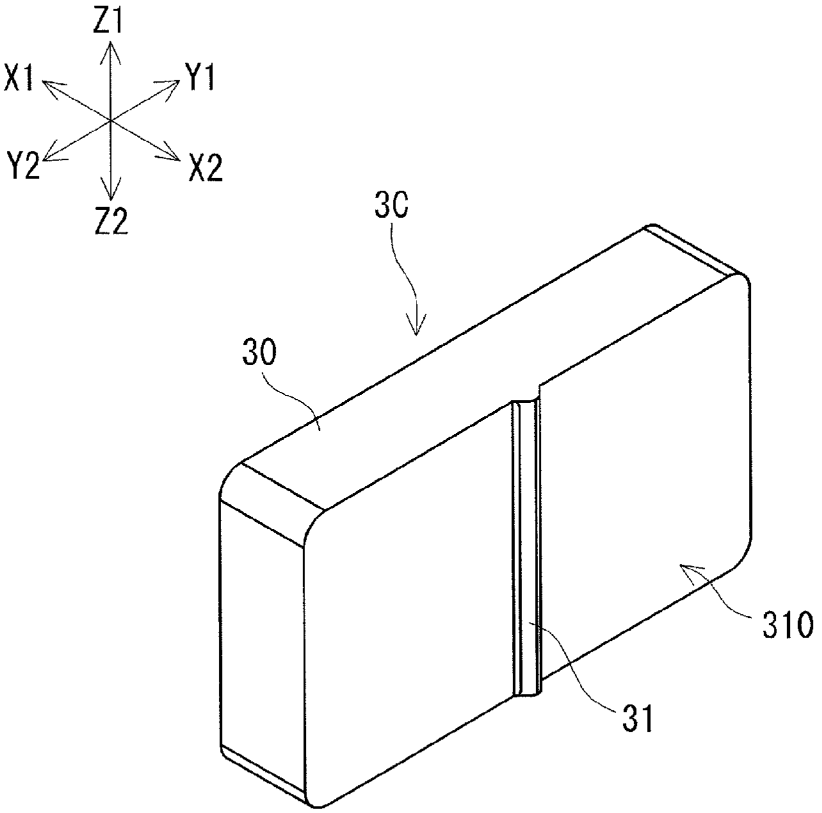
FIG. 4 is a schematic perspective view of the first outer core portion provided in the reactor shown in FIG. 1, as seen from the inner side.

As shown in FIG. 4, the inward protruding portion 31 of the present example is a protruding ridge extending in the Z axis direction. The length of the inward protruding portion 31 in the Z axis direction is preferably as long as or longer than the length of the inner core portions 3A and 3B (FIG. 2) in the Z axis direction. That is, the end portion of the inward protruding portion 31 in the Z1 direction is preferably located at the same position as the end portions of the inner core portions 3A and 3B (FIG. 2) in the Z1 direction, or located further on the Z1 direction side than the end portions of the inner core portions 3A and 3B in the Z1 direction. Similarly, the end portion of the inward protruding portion 31 in the Z2 direction is preferably located at the same position as the end portions of the inner core portions 3A and 3B in the Z2 direction (or located further on Z2 direction side than the end portions of the inner core portions 3A and 3B in the Z2 direction. By employing such a configuration, even if there is a magnetic flux leakage at any position in the Z axis direction, the magnetic flux leakage can be guided to the inward protruding portion 31. In the present example, the end face of the inward protruding portion 31 in the Z1 direction is flush with the end face of the first outer core portion 3C in the Z1 direction, and the end face of the inward protruding portion 31 in the Z2 direction is flush with the end face of the first outer core portion 3C in the Z2 direction.

The cross-sectional shape of the inward protruding portion 31 orthogonal to the Z axis direction is not particularly limited. For example, the cross-section can be a rectangular shape with a constant width from the base side (X1 direction side) of the inward protruding portion 31 to the leading end side (X2 direction side) thereof. In the present example, the cross-section has a peak shape that is wider on the inner face side (base side). The inward protruding portion 31 with the peak-shaped cross-section can be easily disposed to face the space between the winding portions 2A and 2B. The leading end of the inward protruding portion 31 is tapered, and thus the inward protruding portion 31 is unlikely to hamper arrangement of a member near the first outer core portion 3C.

Here, the inward protruding portion 31 may be separate from the main body portion 30. For example, an inward protruding portion 31 produced separate from the main body portion 30 may be adhered to the first inner face 310 of the main body portion 30. Also, the inward protruding portion 31 may be integrally molded with the later-described first holding member 4C (FIGS. 1 and 2). In this case, the inward protruding portion 31 is in contact with or slightly spaced apart from the first inner face 310. The configuration where the inward protruding portion 31 is integrated with the first holding member 4C is described in detail in the description of the first holding member 4C.

Outward Protruding Portion

The outward protruding portion 39 protrudes from the first outer face 319. The outward protruding portion 39 is provided integrally with the main body portion 30. The end face of the outward protruding portion 39 in the X1 direction is flat. This flat face is flush with the surface of the outer resin portion 6 described below, and is exposed to the outside from the outer resin portion 6. The outward protruding portion 39 does not protrude from the outer resin portion 6, and thus the outward protruding portion 39 is unlikely to be damaged when handling the reactor 1.

The cross-sectional area of a magnetic path of the first outer core portion 3C can be increased by the outward protruding portion 39. Thus, the magnetic characteristics of the magnetic core 3 can be improved. Also, by exposing the outward protruding portion 39 from the outer resin portion 6, heat dissipation of the magnetic core 3, that is, heat dissipation of the reactor 1, can be improved.

The outward protruding portion 39 is smaller than the outer circumferential contour line of the first outer face 319. Thus, when the outer protruding portion 39 is viewed from the first outer face 319 side, the outer circumferential contour line of the outward protruding portion 39 is located inside the contour line of the first outer face 319 (in particular, see FIG. 3). Therefore, as shown in FIG. 1, the outer resin portion 6 covering the first outer core portion 3C is in a joined state without being divided in either the Y axis direction or the Z axis direction. The outer resin portion 6 has the role of integrating the later-described inner resin portion 5 and the members constituting the reactor 1. If the outer resin portion 6 that covers the first outer face 319 of the first outer core portion 3C is joined without being divided in either the Y axis direction or the Z axis direction, the first outer core portion 3C can be reliably firmly fixed by the outer resin portion 6.

The protruding length of the outward protruding portion 39 from the first outer face 319 is preferably 0.1 mm to 2.0 mm inclusive. The end face of the outward protruding portion 39 is flush with the surface of the outer resin portion 6, and thus the protruding height of the outward protruding portion 39 may be considered as being equal to the thickness of the outer resin portion 6 covering the first outer face 319. That is, the protruding length of the outward protruding portion 39 being 0.1 mm or more means that the thickness of the outer resin portion 6 covering the first outer face 319 is 0.1 mm or more. As described above, the outer resin portion 6 covering the first outer face 319 is not divided in the Y axis direction nor the Z axis direction. Thus, if the thickness of the outer resin portion 6 is 0.1 mm or more, the effect of the outer resin portion 6 firmly fixing the first outer core portion 3C can be sufficiently obtained. On the other hand, if the protruding length of the outward protruding portion 39 is 2.0 mm or less, the length of the magnetic core 3 in the X axis direction is not excessively long. Thus, the reactor 1 can be kept from being unnecessarily large. The protruding length of the outward protruding portion 39 is more preferably 1.0 mm to 2.0 mm inclusive.

By installing the reactor 1 including the above-described outward protruding portion 39 at the installation target with reference to the end face of the outward protruding portion 39, the reactor 1 can be easily connected to an external device. Because the outward protruding portion 39 is provided on the first outer core portion 3C close to the winding wire end portions 2*a* and 2*b*, even if there is a dimensional error in the members of the reactor 1, the distance between the end face of the outward protruding portion 39 and the winding wire end portions 2*a* and 2*b* can be accurately determined with ease. Also, because the end face of the outward protruding portion 39 is exposed from the outer resin portion 6, variations in the thickness of the outer resin portion 6 do not degrade the accuracy of the above-described distance. Therefore, if the reactor 1 is installed at a predetermined position of the installation target with reference to the end face of the outward protruding portion 39, the winding wire end portions 2*a* and 2*b* of the reactor 1 can be accurately disposed at a desired position of the installation target. As a result, the external device provided at the installation target and the winding wire end portions 2*a* and 2*b* of the reactor 1 can easily be connected to each other.

Magnetic Characteristics, Materials, Etc.

It is preferable that the relative magnetic permeability of the inner core portions 3A and 3B is from 5 to 50 inclusive, and that the relative magnetic permeability of the outer core portions 3C and 3D is higher than the relative magnetic permeability of the inner core portions 3A and 3B. The relative magnetic permeability of the inner core portions 3A and 3B can also be set to 10 to 45 inclusive, 15 to 40 inclusive, and 20 to 35 inclusive. On the other hand, the relative magnetic permeability of the outer core portions 3C and 3D is preferably 50 to 500 inclusive. The relative magnetic permeability of the outer core portions 3C and 3D can be set to 80 or more, 100 or more, 150 or more, and 180 or more. By making the relative magnetic permeability of the outer core portions 3C and 3D higher than the relative magnetic permeability of the inner core portions 3A and 3B, a magnetic flux leakage between the inner core portions 3A and 3B and the first outer core portion 3C and between the inner core portions 3A and 3B and the second outer core portion 3D can be mitigated. Particularly, by increasing the difference between the relative magnetic permeability of the inner core portions 3A and 3B and the outer core portions 3C and 3D, for example, increasing the relative magnetic permeability of the outer core portions 3C and 3D to be at least double the relative magnetic permeability of the inner core portions 3A and 3B, a magnetic flux leakage can be further mitigated. Also, because the relative magnetic permeability of the inner core portions 3A and 3B is low compared to the relative magnetic permeability of the outer core portions 3C and 3D, the relative magnetic permeability of the entire magnetic core 3 can be kept from being excessively high. As a result, the magnetic core 3 with a gapless structure can be realized.

The inner core portions 3A and 3B and the outer core portions 3C and 3D are formed of a powder compact formed by compression molding base powder including a soft magnetic powder, or alternatively formed of a compact made of a composite material of a soft magnetic powder and resin. The soft magnetic powder of the powder compact is an aggregate of soft magnetic particles composed of, for example, an iron-group metal such as iron or an alloy thereof (Fe—Si alloy, Fe—Ni alloy, etc.). The surface of the soft magnetic powder particles may be provided with an insulating coating made of phosphate or the like. The base powder may include a lubricant.

The compact of the composite material is manufactured by filling a mixture of soft magnetic powder and unsolidified resin into a mold, and solidifying the resin. The same materials that can be used in the powder compact can also be used in the soft magnetic powder of the composite material. On the other hand, the resin included in the composite material can be a thermosetting resin, a thermoplastic resin, a room temperature curing resin, a cold curing resin, and the like. The thermosetting resin can be, for example, an unsaturated polyester resin, an epoxy resin, a urethane resin, a silicone resin, or the like. The thermoplastic resin can be a polyphenylene sulfide (PPS) resin, a polytetrafluoroethylene (PTFE) resin, a liquid crystal polymer (LCP), a polyamide resin (PA) such as nylon 6 or nylon 66, a polybutylene terephthalate (PBT) resin, an acrylonitrile-butadiene-styrene (ABS) resin, or the like. Also, a bulk molding compound (BMC) in which calcium carbonate or glass fiber is mixed with unsaturated polyester, millable type silicone rubber, millable type urethane rubber, and the like can also be used. When the above-described composite material contains, in addition to the soft magnetic power and the resin, a non-magnetic, non-metallic powder (filler) such as alumina or silica, the heat dissipation is further improved. The content of the non-magnetic, non-metallic powder can be, for example, 0.2 mass % to 20 mass % inclusive, and can further be 0.3 mass % to 15 mass % inclusive, and 0.5 mass % to 10 mass % inclusive.

The content of the soft magnetic powder in the composite material can be, for example, 30 volume % to 80 volume % inclusive. From the viewpoint of saturated magnetic flux density and improving heat dissipation, the content of the magnetic powder can also be 50 volume % or more, 60 volume % or more, and 70 volume % or more. From the viewpoint of improving fluidity in the manufacturing process, the content of the magnetic power is preferably 75 volume % or less. The relative magnetic permeability of the compact of the composite material can be easily reduced by adjusting the filling rate of the soft magnetic powder to be low. Thus, the compact of the composite material is favorable for producing inner core portions 3A and 3B with relative magnetic permeability satisfying 5 to 50 inclusive. In the present example, the inner core portions 3A and 3B are constituted by compacts made of the composite material, and have a relative magnetic permeability of 20.

It is easier to increase the content of soft magnetic powder in the powder contact (for example, to more than 80 volume %, and further to 85 volume % or more) than the compact of the composite material, and a core piece with higher saturated magnetic flux density and relative magnetic permeability can be easily obtained. Thus, the powder compact is favorable for producing the outer core portions 3C and 3D with a relative magnetic permeability of 50 to 500 inclusive. In the present example, the outer core portions 3C and 3D are constituted by powder compacts, and have a relative magnetic permeability of 200. Naturally, the outer core portions 3C and 3D may be constituted by a compact made of a composite material. If a compact made of a composite material is employed, a first outer core portion 3C with a complex shape including the inward protruding portion 31 and the outward protruding portion 39 can be easily produced.

Holding Member

The reactor 1 according to the present example shown in FIG. 1 further includes the first holding member 4C and the second holding member 4D. As shown in FIG. 2, the first holding member 4C is a member interposed between the end face of the winding portions 2A and 2B of the coil 2 in the X1 direction and the first inner face 310 of the first outer core portion 3C of the magnetic core 3, and holds these portions. The second holding member 4D is a member interposed between the end face of the winding portions 2A and 2B of the coil 2 in the X2 direction and second inner face 320 of the second outer core portion 3D of the magnetic core 3, and holds these portions. The holding members 4C and 4D are typically made of an insulating material such as polyphenylene sulfide resin. The holding members 4C and 4D function as insulating members between the coil 2 and the magnetic core 3 and positioning members that position the inner core portions 3A and 3B and the outer core portions 3C and 3D relative to the winding portions 2A and 2B.

Figure 5:
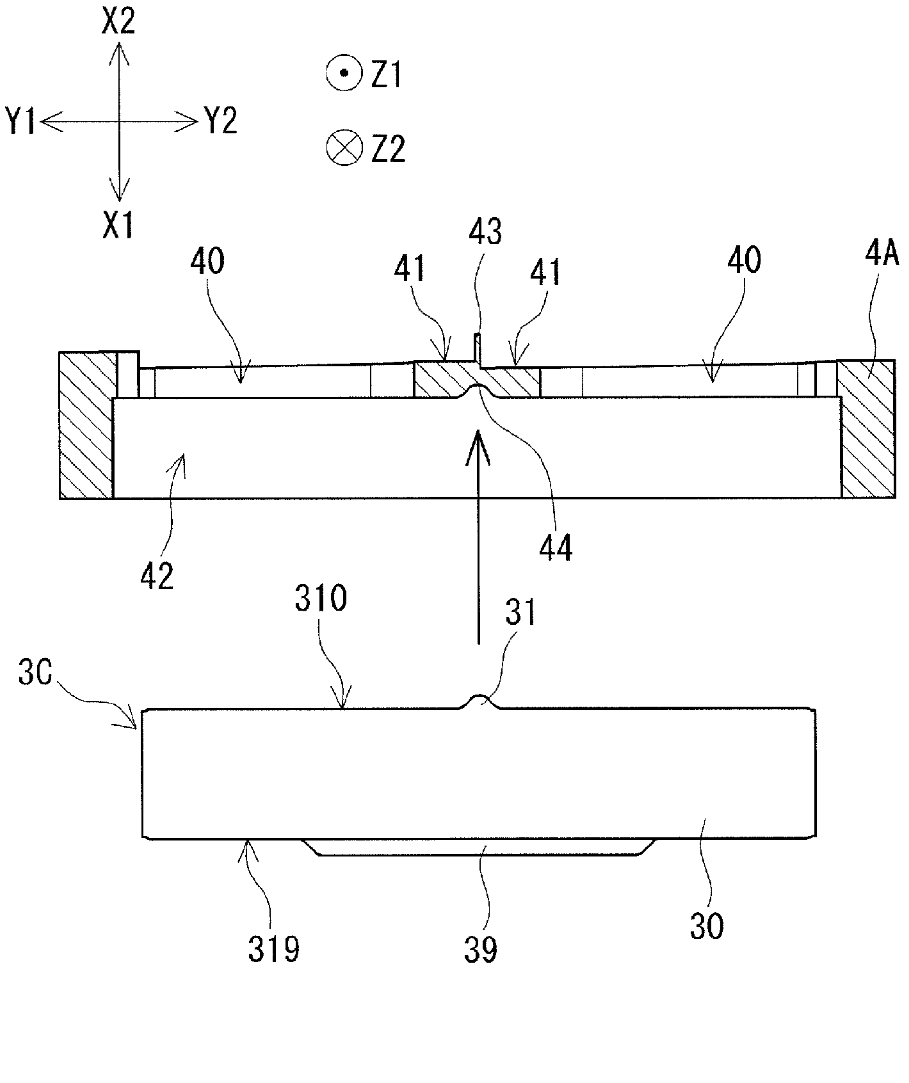
FIG. 5 is a schematic view of the first outer core portion and a first holding member provided in the reactor shown in FIG. 1.

Below, an example of the holding members 4C and 4D is described with reference to FIG. 5. In FIG. 5, the configuration of the first holding member 4C is described. In FIG. 5, the first holding member 4C is shown cut at the center in the Z axis direction. The first outer core portion 3C is shown in an uncut state.

As shown in FIG. 5, the first holding member 4C includes a pair of through holes 40 and 40, a pair of coil housing portions 41 and 41, a core housing portion 42, and a partition portion 43. The through holes 40 pass through the first holding member 4C in the thickness direction thereof. As shown in FIG. 2, the inner core portions 3A and 3B are inserted into the through holes 40. The coil housing portions 41 are formed on the face of the first holding member 4C on the X2 direction side. End faces and the surrounding regions thereof of the winding portions 2A and 2B (FIG. 1) are respectively fitted into the coil housing portions 41. The core housing portion 42 is a recess formed in the face of the first holding member 4C on the X1 direction side. The first inner face 310 and the surrounding region thereof of the first outer core portion 3C are fitted into the core housing portion 42 (see FIG. 2 also). The partition portion 43 is interposed between the first winding portion 2A and the second winding portion 2B. The partition portion 43 ensures insulation between the winding portions 2A and 2B. These configurations are also included in the second holding member 4D. As shown in FIG. 1, the second holding member 4D also includes a cutout portion 45 in which the coupling portion 2R of the coil 2 is housed.

The first holding member 4C further includes a protrusion housing portion 44. The protrusion housing portion 44 is provided at a position corresponding to the inward protruding portion 31 of the first outer core portion 3C. The inner circumferential surface shape of the protrusion housing portion 44 is of a shape corresponding to the outer circumferential surface shape of the inward protruding portion 31. Thus, as shown with a thick arrow, when the first outer core portion 3C is fitted to the first holding member 4C, the inward protruding portion 31 is housed in the protrusion housing portion 44. As a result, the first outer core portion 3C is positioned relative to the first holding member 4C, and thus the inward protruding portion 31 is disposed at an appropriate position relative to the winding portions 2A and 2B.

Figure 6:
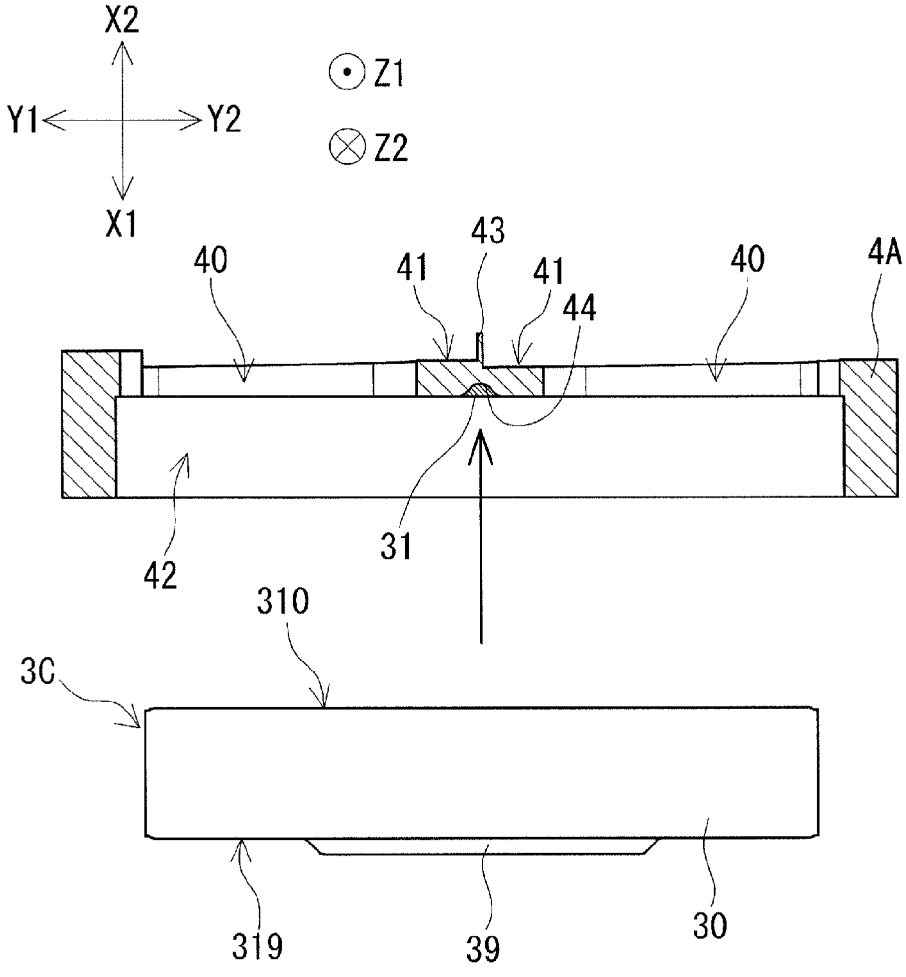
FIG. 6 is a schematic view of a first outer core portion and a first holding member of a different configuration to those shown in FIG. 5.

As shown in FIG. 6, the inward protruding portion 31 formed in advance using the composite material can be integrated with the first holding member 4C. In the example shown in FIG. 6, the inward protruding portion 31 is insert-molded in the first holding member 4C. If the configuration in FIG. 6 is employed, damage to the inward protruding portion 31 can be suppressed when the first outer core portion 3C is fitted to the first holding member 4C. When the first outer core portion 3C is fitted to the first holding member 4C, the inward protruding portion 31 comes into contact with the first inner face 310 or is slightly spaced apart therefrom. Even if the inward protruding portion 31 is spaced apart from the first inner face 310, the inward protruding portion 31 is deemed as a portion of the first outer core portion 3C.

Inner Resin Portion

As shown in FIG. 2, the inner resin portion 5 is disposed inside the winding portions 2A and 2B. The inner resin portion 5 inside the first winding portion 2A joins the inner circumferential face of the first winding portion 2A and the outer circumferential face of the first inner core portion 3A. The inner resin portion 5 inside the second winding portion 2B joins the inner circumferential face of the second winding portion 2B and the outer circumferential face of the second inner core portion 3B. The inner resin portion 5 remains inside the winding portion 2A (2B) without spanning between the inner circumferential face and the outer circumferential face of the winding portion 2A (2B). That is, the outer circumferential faces of the winding portions 2A and 2B are exposed to the outside without being covered in resin, as shown in FIG. 1.

For the inner resin portion 5, for example, a thermosetting resin such as an epoxy resin, a phenol resin, a silicone resin, and a urethane resin, a thermoplastic resin such as a PPS resin, a PA resin, a polyimide resin, and a fluororesin, a room temperature curing resin, or a cold curing resin can be used. A ceramic filler such as alumina or silica may be added to these resins to improve the heat dissipation of the inner resin portion 5.

Outer Resin Portion

As shown in FIGS. 1 and 2, the outer resin portion 6 is disposed so as to cover the portion of the outer core portion 3C (3D) exposed from the holding member 4C (4D). The outer resin portion 6 fixes the outer core portion 3C (3D) to the holding member 4C (4D) and protects the outer core portions 3C and 3D from the external environment. The outer resin portion 6 in the present example is joined to the inner resin portion 5. That is, the outer resin portion 6 and the inner resin portion 5 are formed at the same time using the same resin. The coil 2, the magnetic core 3, and the holding members 4C and 4D are integrated with each other by the resin portions 5 and 6. Thus, the reactor 1 in the present example can be installed in a vehicle or the like in the state shown in FIG. 1.

The outer resin portion 6 in the present example is only provided on the side of the holding member 4C (4D) where the outer core portion 3C (3D) is disposed, and does not extend to the outer circumferential face of the winding portions 2A and 2B. In view of the functions of the outer resin portion 6 of fixing and protecting the outer core portions 3C and 3D, the extent of the forming range of the outer resin portion 6 shown in the drawings is sufficient. Limiting the forming range of the outer resin portion 6 provides the benefit of being able to reduce the usage amount of resin, and the benefit of being able to suppress an unnecessary increase in the size of the reactor 1 due to the outer resin portion 6.

The end face of the outward protruding portion 39 in the X1 direction is exposed from the outer resin portion 6 covering the outer circumference of the first outer core portion 3C. The end face of the outward protruding portion 39 in the X1 direction is flush with the end face of the outer resin portion 6 in the X1 direction. The outer resin portion 6 covers the entire first outer face 319 so as to surround the outward protruding portion 39. The outer resin portion 6 is not divided in the Y axis direction nor the Z axis direction, and thus the fixing strength of the first outer core portion 3C imparted by the outer resin portion 6 can be increased.

Gate marks 60 and holes 61 are formed in the outer resin portion 6 covering the outer circumference of the second outer core portion 3D. The gate marks 60 and the holes 61 are left over from molding the outer resin portion 6 and inner resin portion 5 through resin molding. The gate marks 60 are formed by resin filling holes 70 (gates) of a resin molding mold 7 shown in FIG. 7. The holes 61 are formed by support members 71 that position the magnetic core 3 in the mold 7 shown in FIG. 7.

Usage Mode

The reactor 1 according to the present example can be used as a constituent member of a power conversion device such as a bidirectional DC/DC converter that is installed in electric vehicles such as a hybrid automobile, an electric automobile, and a fuel-cell automobile. The reactor 1 in the present example can be used in a state where it is immersed in a liquid refrigerant. There is no particular limitation on the liquid refrigerant, but ATF (Automatic Transmission Fluid) and the like can be used as the liquid refrigerant if the reactor 1 is to be used in a hybrid automobile. Other usable examples of the liquid refrigerant include a fluorine-based inert liquid such as Fluorinert (registered trademark), a fluorocarbon-based refrigerant such as HCFC-123 and HFC-134a, an alcohol-based refrigerant such as methanol and alcohol, and a ketone-based refrigerant such as acetone. In the reactor 1 according to the present example, the winding portions 2A and 2B are exposed to the outside, and thus, when the reactor 1 is cooled in a cooling medium such as a liquid refrigerant, the winding portions 2A and 2B can be brought into direct contact with the cooling medium and therefore the reactor 1 according to the present example has excellent heat dissipation.

The face of the reactor 1 in the present example in the Z2 direction can configured to be the installation face. The installation face of the reactor 1 is the face that comes into contact with an installation target such as a cooling base. Also, the face of the reactor 1 in the Y1 direction, the face of the reactor 1 in the Y2 direction, the face of the reactor 1 in the X1 direction, or the face of the reactor 1 in the X2 direction can be configured to be the installation face that comes into contact with the installation target.

Effects

In the reactor 1 in the present example, the winding wire end portions 2*a* and 2*b* of the reactor 1 are accurately positioned with reference to the outward protruding portion 39. Therefore, by installing the reactor 1 to the installation target with reference to the outward protruding portion 39, the winding wire end portions 2*a* and 2*b* can be accurately disposed at a desired position of the installation target. As a result, the winding wire end portions 2*a* and 2*b* of the reactor 1 can be easily connected to an external device, and thus a converter or the like including the reactor 1 can be easily produced.

Reactor Manufacturing Method

Figure 7:
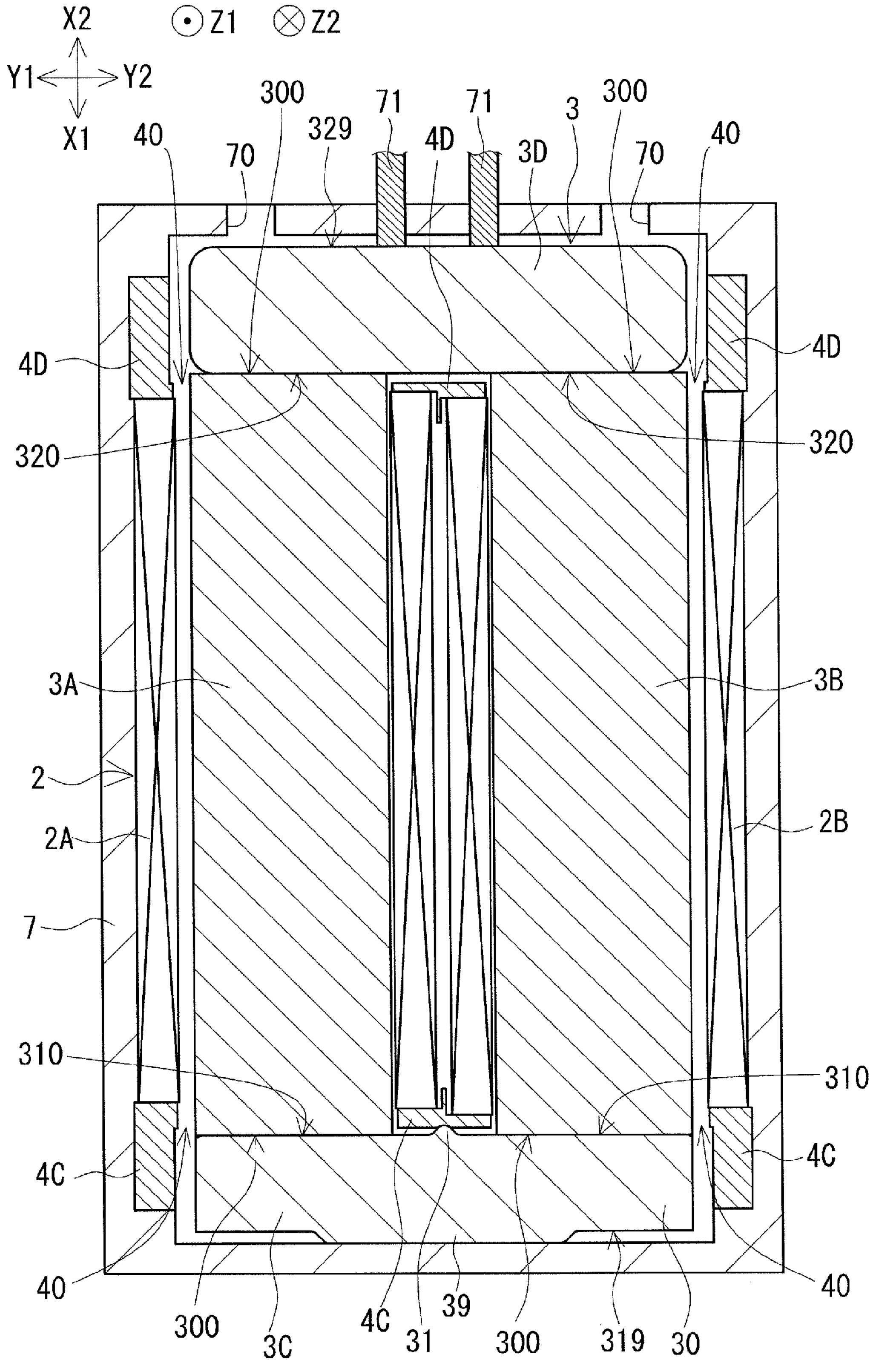
FIG. 7 is a diagram for describing an example of a manufacturing method of the reactor shown in FIG. 1.

Next, an example of a reactor manufacturing method for manufacturing the reactor 1 according to Embodiment 1 will be described according to FIG. 7. The reactor manufacturing method broadly includes the following steps.

A step of combining the coil 2, the magnetic core 3, and the holding members 4C and 4D (Step I)

A step of filling resin into the winding portions (Step II)

A step of solidifying the resin (Step III)

[Step I] In this step, the coil 2, the magnetic core 3, and the holding members 4C and 4D are combined. For example, a first assembly in which the inner core portions 3A and 3B are respectively disposed inside the winding portion 2A and 2B, and the pair of holding members 4C and 4D are respectively abutted against the one end face and the other end face of the winding portions 2A and 2B is produced. Then a second assembly in which the first assembly is sandwiched by the pair of outer core portions 3C and 3D is produced. The end face 300 of the inner core portions 3A and 3B can be joined to the first inner face 310 of the first outer core portion 3C and the end face 300 of the inner core portions 3A and 3B can be joined to the second inner face 320 of the second outer core portion 3D using an adhesive or the like.

[Step II] In step II, resin is filled into the winding portions 2A and 2B of the second assembly. In the present example, injection molding in which resin is injected into the mold 7 is performed with the second assembly disposed in the mold 7. The second assembly disposed in the mold 7 is pressed in the X1 direction. Specifically, the second outer face 329 of the second outer core portion 3D is pressed by the support members 71 and 71. As a result, the end face of the outward protruding portion 39 of the second assembly is abutted against the inner circumferential face of the mold 7.

The resin is injected into the two resin filling holes 70 of the mold 7. The resin filling holes 70 are provided at positions corresponding to the second outer face 329 of the second outer core portion 3D. Resin filled into the mold 7 via the resin filling holes 70 covers the entire outer circumference of the second outer core portion 3D and flows into the winding portions 2A and 2B via the through holes 40 of the second holding member 4D. The resin that has flowed into the winding portions 2A and 2B passes through the through holes 40 of the first holding member 4C and reaches the first outer core portion 3C. At this time, the end face of the outward protruding portion 39 of the first outer core portion 3C is in contact with the inner circumferential face of the mold 7, and thus this end face is exposed to the outside without being covered by resin.

[Step III] In step III, the resin is solidified through heat treatment or the like. Of the solidified resin, the solidified resin inside the winding portions 2A and 2B is the inner resin portion 5 as shown in FIG. 2, and the solidified resin covering the outer core portions 3C and 3D is the outer resin portion 6. The inner resin portion 5 and the outer resin portion 6 are joined to each other inside the holding members 4C and 4D.

Effects

According to the reactor manufacturing method described above, the reactor 1 shown in FIG. 1 can be manufactured. Also, in the reactor manufacturing method of the present example, because the inner resin portion 5 and the outer resin portion 6 are integrally formed and the step of filling resin and the step of curing resin need only be performed one time each, the reactor 1 can be manufactured with high productivity.

Also, according to the reactor manufacturing method of the present example, the winding wire end portions 2*a* and 2*b* (FIG. 1) can be accurately positioned in the reactor 1. As shown in FIG. 7, the resin portions 5 and 6 are formed with the end face of the outward protruding portion 39 abutted against the inner circumferential face of the mold 7. Therefore, the winding wire end portions 2*a* and 2*b* are accurately positioned with reference to the end face of the outward protruding portion 39. If the reactor 1 is installed to the installation target with reference to the end face of the outward protruding portion 39, the winding wire end portions 2*a* and 2*b* can be accurately disposed at a desired position of the installation target. As a result, these winding wire end portions 2*a* and 2*b* can be easily connected to an external device.

Test Examples

Inductance and total loss of the reactor 1 including the inward protruding portion 31 shown in Embodiment 1 and a reference reactor without the inward protruding portion 31 were measured through simulation. The relative magnetic permeability of the inner core portions 3A and 3B of both reactors was 20 and the relative magnetic permeability of the outer core portions 3C and 3D was 200. Also, the protruding length of the inward protruding portion 31 of the reactor 1 of Embodiment 1 was 1.2 mm. Commercially available software (JMAG-Designer manufactured by JSOL Corporation) was used in the simulation of inductance and total loss.

The inductance (μH) when a current of 100 A or 200 A or less was applied to each sample reactor was obtained through simulation. The results are listed below.

Reactor of Embodiment 1 86 μH (100 A), 45.6 μH (200 A)

Reference reactor 85.5 μH (100 A), 45.3 μH (200 A)

As described above, under both the energization condition of 100 A and the energization condition of 200 A, the inductance of the reactor 1 according to Embodiment 1 was higher than that of the reference reactor. The rate of increase in the inductance of the reactor 1 was 0.6% under the energization condition of 100 A and 0.7% under the energization condition of 200 A. That is, it was found that there is a tendency for the difference between the inductance of the reactor 1 of Embodiment 1 and the inductance of the reference reactor to increase as the energizing current increases.

DC copper loss, steel loss, and AC copper loss when each sample reactor was driven with a direct current of 50 A, an input voltage of 300 V, an output voltage of 300 V, and a frequency of 20 kHz were obtained through simulation. The sum of the DC copper loss, steel loss, and AC copper loss was taken as the total loss (W). The results are listed below.

Reactor of Embodiment 1 83.9 W

Reference reactor 84.9 W

As shown above, the total loss of the reactor 1 of Embodiment 1 was smaller than the loss of the reference reactor. The reduction rate of the loss was approximately 1.2%.

It was found from the results of the above-described simulation that even a very small inward protruding portion 31 was effective in improving the magnetic characteristics of the reactor 1.

The invention claimed is:

1. A reactor including a coil including a first winding portion and a second winding portion arranged parallel to each other, and a magnetic core that forms a ring-shaped closed magnetic circuit,
- the magnetic core including a first inner core portion, a second inner core portion, a first outer core portion, and a second outer core portion,
  - the first inner core portion being disposed inside the first winding portion,
  - the second inner core portion being disposed inside the second winding portion,
  - the first outer core portion joining one end of the first inner core portion and one end of the second inner core portion, and
  - the second outer core portion joining another end of the first inner core portion and another end of the second inner core portion,
- the reactor comprising:
- an inner resin portion filled inside the first winding portion and the second winding portion; and
- an outer resin portion that is joined to the inner resin portion and covers at least a portion of the first outer core portion and the second outer core portion,
- wherein the first outer core portion includes:
  - a first inner face that faces the coil;
  - a first outer face on an opposite side to the first inner face; and
  - an outward protruding portion that protrudes from the first outer face, and
- when viewed from the first outer face side, an outer circumferential contour line of the outward protruding portion is located inside an outer circumferential contour line of the first outer face, and
- an end face of the outward protruding portion is exposed from the outer resin portion and is flush with a surface of the outer resin portion.

2. The reactor according to claim 1, wherein the second outer core portion includes:
- a second inner face that faces the coil; and
- a second outer face on an opposite side to the second inner face, and
- the second outer face is covered by the outer resin portion, and the outer resin portion has a gate mark in the portion covering the second outer face.

3. The reactor according to claim 1, wherein the coil includes:
- a first winding wire end portion drawn out from the first winding portion on one end side in an axial direction of the first winding portion; and
- a second winding wire end portion drawn out from the second winding portion on the same side as the first winding wire end portion, and
- the first outer core portion is provided on the side on which the first winding wire end portion and the second winding wire end portion are disposed.

4. The reactor according to claim 1, wherein a protruding length of the outward protruding portion from the first outer face is 0.1 mm to 2.0 mm inclusive.

5. The reactor according to claim 1, comprising:
- a first holding member that is interposed between an end face of the coil and the first outer core portion, and holds the coil and the first outer core portion; and
- a second holding member that is interposed between an end face of the coil and the second outer core portion, and holds the coil and the second outer core portion,
- wherein the inner resin portion and the outer resin portion are joined to each other inside the first holding member and the second holding member.

6. The reactor according to claim 1, comprising an inward protruding portion provided on the first inner face and protruding toward a space between the first winding portion and the second winding portion.

7. The reactor according to claim 1, wherein a relative magnetic permeability of the first inner core portion and the second inner core portion is 5 to 50 inclusive, and is lower than a relative magnetic permeability of the first outer core portion and the second outer core portion.

8. The reactor according to claim 7, wherein the relative magnetic permeability of the first outer core portion and the second outer core portion is 50 to 500 inclusive.

9. The reactor according to claim 7, wherein the first inner core portion and the second inner core portion are formed of a compact made of a composite material including a soft magnetic powder and resin.

10. The reactor according to claim 7, wherein the first outer core portion and the second outer core portion are formed of a powder compact made of a soft magnetic powder.

* * * * *